US012327844B2

(12) United States Patent
Vissers et al.

(10) Patent No.: US 12,327,844 B2
(45) Date of Patent: Jun. 10, 2025

(54) MATERIALS TO IMPROVE THE PERFORMANCE OF LITHIUM AND SODIUM BATTERIES

(71) Applicant: UCHICAGO ARGONNE, LLC, Chicago, IL (US)

(72) Inventors: Daniel R. Vissers, Wheaton, IL (US); Khalil Amine, Oakbrook, IL (US); Zonghai Chen, Bolingbrook, IL (US); Ujjal Das, Naperville, IL (US)

(73) Assignee: UCHICAGO ARGONNE, LLC, Chicago, IL (US)

( * ) Notice: Subject to any disclaimer, the term of this patent is extended or adjusted under 35 U.S.C. 154(b) by 237 days.

(21) Appl. No.: 17/205,099

(22) Filed: Mar. 18, 2021

(65) Prior Publication Data
US 2021/0210795 A1    Jul. 8, 2021

Related U.S. Application Data (62) Division of application No. 15/463,899, filed on Mar. 20, 2017, now Pat. No. 10,978,748.
(Continued)

(51) Int. Cl.
*H01M 10/42* (2006.01)
*H01M 4/04* (2006.01)
(Continued)

(52) U.S. Cl.
CPC ..... *H01M 10/4235* (2013.01); *H01M 4/0402* (2013.01); *H01M 4/366* (2013.01); *H01M 4/62* (2013.01); *H01M 10/0525* (2013.01); *H01M 10/054* (2013.01); *H01M 50/451* (2021.01); *H01M 4/505* (2013.01)

(58) Field of Classification Search
None
See application file for complete search history.

(56) References Cited

U.S. PATENT DOCUMENTS

| 6,183,718 | B1 |   | 2/2001  | Barker et al. |         |
|-----------|----|---|---------|---------------|---------|
| 7,122,278 | B1 | * | 10/2006 | Nakashima     | H01M 4/38 |
|           |    |   |         |               | 429/224 |

(Continued)

FOREIGN PATENT DOCUMENTS

| EP | 1194965     | * | 9/2003 | ............. H01M 4/62 |
| JP | 2009-091610 | A |  4/2009 |                         |

(Continued)

OTHER PUBLICATIONS

Feng et al., "A chromium oxide solution modified lithium titanium oxide with much improved rate performance," J. Materials Chemistry A, 2013, 1, 15310-15315 (Year: 2013).*

(Continued)

*Primary Examiner* — Amanda J Barrow
(74) *Attorney, Agent, or Firm* — Foley & Lardner LLP (57) ABSTRACT

A lithium or sodium battery includes a cathode containing manganese; an anode containing an active anode material; a separator; an electrolyte; and a transition metal ion sequestration agent; wherein the transition metal ion sequestration agent contains a micron or nano-sized inorganic compound and the transition metal ion sequestration agent is located at the anode, in the electrolyte, or any combination thereof.

12 Claims, 1 Drawing Sheet

Related U.S. Application Data (60) Provisional application No. 62/312,941, filed on Mar. 24, 2016.

(51) Int. Cl.
  H01M 4/36 (2006.01)
  H01M 4/62 (2006.01)
  H01M 10/0525 (2010.01)
  H01M 10/054 (2010.01)
  H01M 50/451 (2021.01)
  H01M 4/505 (2010.01)

(56) References Cited

U.S. PATENT DOCUMENTS

| | | | |
|---|---|---|---|
| 7,748,497 B2 | 7/2010 | Tolliver et al. | |
| 7,968,235 B2 | 6/2011 | Amine et al. | |
| 9,012,096 B2 | 4/2015 | Amine et al. | |
| 9,177,689 B2 | 11/2015 | Paulsen et al. | |
| 9,543,622 B2 * | 1/2017 | Nagase | H01M 10/052 |
| 2003/0180623 A1 | 9/2003 | Yun et al. | |
| 2006/0147809 A1 | 7/2006 | Amine et al. | |
| 2006/0286446 A1 | 12/2006 | Chun et al. | |
| 2007/0264571 A1 * | 11/2007 | Ryu | H01M 10/4235 |
| | | | 429/218.1 |
| 2008/0193841 A1 | 8/2008 | Sun et al. | |
| 2008/0254370 A1 | 10/2008 | Lee et al. | |
| 2009/0011333 A1 * | 1/2009 | Wakita | H01M 4/136 |
| | | | 429/220 |
| 2009/0053594 A1 | 2/2009 | Johnson et al. | |
| 2010/0167129 A1 | 7/2010 | Wu et al. | |
| 2011/0045337 A1 * | 2/2011 | Lee | H01M 6/181 |
| | | | 29/623.2 |
| 2012/0228562 A1 * | 9/2012 | Jo | C01G 51/54 |
| | | | 977/773 |
| 2013/0157149 A1 * | 6/2013 | Peled | H01M 12/06 |
| | | | 429/405 |
| 2013/0183582 A1 | 7/2013 | Halalay et al. | |
| 2014/0017557 A1 | 1/2014 | Lockett et al. | |
| 2014/0023940 A1 * | 1/2014 | Zaghib | H01M 4/382 |
| | | | 429/405 |
| 2014/0113203 A1 * | 4/2014 | Xiao | H01M 10/0525 |
| | | | 429/200 |
| 2014/0199587 A1 * | 7/2014 | Han | H01M 4/364 |
| | | | 429/211 |
| 2014/0329151 A1 * | 11/2014 | Onizuka | H01M 4/485 |
| | | | 429/231.95 |
| 2015/0017534 A1 | 1/2015 | Miyuki et al. | |
| 2015/0044517 A1 * | 2/2015 | Mikhaylik | H01M 4/382 |
| | | | 429/49 |
| 2015/0093660 A1 | 4/2015 | Barde | |
| 2015/0111097 A1 * | 4/2015 | Park | C01G 45/1228 |
| | | | 429/188 |
| 2015/0147625 A1 * | 5/2015 | Nakai | H01M 10/052 |
| | | | 429/163 |
| 2015/0155538 A1 * | 6/2015 | Tang | H01M 50/434 |
| | | | 429/188 |
| 2015/0318530 A1 * | 11/2015 | Yushin | H01M 10/36 |
| | | | 429/131 |
| 2015/0349307 A1 * | 12/2015 | Dadheech | H01M 4/0402 |
| | | | 427/446 |
| 2015/0372274 A1 | 12/2015 | Hamon et al. | |
| 2016/0013465 A1 | 1/2016 | Akiike | |
| 2016/0079601 A1 * | 3/2016 | Yoshitake | H01M 10/0525 |
| | | | 429/212 |
| 2016/0156029 A1 * | 6/2016 | Sakai | H01M 4/133 |
| | | | 205/59 |
| 2019/0341656 A1 * | 11/2019 | Nam | H01M 10/0525 |

FOREIGN PATENT DOCUMENTS

| | | | | |
|---|---|---|---|---|
| KR | 10-2004-007151 | * | 12/2004 | H01M 4/02 |
| KR | 10-2007-0020759 | * | 2/2007 | H01M 4/02 |
| WO | WO 01/41237 | * | 6/2001 | H01M 4/24 |
| WO | WO 2006/062346 | * | 6/2006 | H01M 10/40 |
| WO | WO 2009/107964 | * | 9/2009 | H01M 14/02 |
| WO | WO 2015/011978 | * | 1/2015 | H01M 4/02 |

OTHER PUBLICATIONS

Baltrusaitis, et al., "Electronic Properties and Reactivity of Simulated Fe3 and Cr3 Substituted a-Al2O3 (0001 Surface)," J. Phys. Chem. C. Nanomater Interfaces, 116(35):18857-18856 (2012).

Fu, et al., "Tailoring Mesoporous y-Al2O3 Properties by Transition Metal Doping: A Combined Experimental and Computational Study," Chem. Mat. 29:1338-1349 (2016).

International Search Report & Written Opinion in International Application No. PCT/US2017/023882, mailed on Jun. 16, 2017 (8 pages).

Vissers et al., "Role of Manganese Deposition on Graphite in the Capacity Fading of Lithium Ion Batteries," ACS Applied Materials and Interfaces, 8(22), (Jun. 2016) 14244-14251.

* cited by examiner

MATERIALS TO IMPROVE THE PERFORMANCE OF LITHIUM AND SODIUM BATTERIES

CROSS-REFERENCE TO RELATED APPLICATIONS

This application is a divisional of U.S. patent application Ser. No. 15/463,899, filed on Mar. 20, 2017, which claims the benefit of priority to U.S. Provisional Patent Application No. 62/312,941, filed on Mar. 24, 2016, both of which are incorporated herein by reference in their entirety for any and all purposes.

GOVERNMENT SUPPORT STATEMENT

This invention was made with government support under Contract No. DE-AC02-06CH11357 awarded by the United States Department of Energy to UChicago Argonne, LLC, operator of Argonne National Laboratory. The government has certain rights in the invention.

FIELD

The present technology is generally related to batteries containing inorganic sequestration agent(s), and methods to prepare batteries containing the same.

BACKGROUND

Lithium or sodium batteries are two classes of electrochemical energy storage devices. These devices comprise a cathode (positive electrode), an anode (negative electrode), and an electrolyte filling the space between the electrically insulated cathode and anode.

SUMMARY

In one aspect, provided herein are lithium or sodium batteries including a cathode containing manganese; an anode containing an active anode material; a separator; an electrolyte; and a transition metal ion sequestration agent; wherein the transition metal ion sequestration agent contains a micron or nano-sized inorganic compound and the transition metal ion sequestration agent is located on and/or within the separator; on and/or within the anode; in the electrolyte; or any combination thereof.

In some embodiments, the transition metal ion sequestration agent is located on and/or within the separator. In some embodiments, the micron or nano-sized inorganic compound contains a compound that is $X_2CO_3$, XF, $X_2O$, $X_2S$, $X_2CrO_4$, $X_2Cr_2O_7$, $X_2O_2$, $XO_2$, or a combination of any two or more thereof, where X is independently Li, Na, or K. In some embodiments, the transition metal ion sequestration agent is located in a coating on the surface of the separator. The coating may be formed by a method selected from the group consisting of chemical vapor deposition, physical vapor deposition, atomic layer deposition, sol-gel synthesis, co-precipitation synthesis, a spray-drying process, a hydrothermal process, slurry casting, and any combination of two or more thereof.

In some embodiments, the transition metal ion sequestration agent is located on and/or within the anode. In some embodiments, the micron or nano-sized inorganic compound contains a compound selected from the group consisting of $X_2CO_3$, XF, $X_2O$, $X_2S$, $X_2CrO_4$, $X_2Cr_2O_7$, $X_2O_2$, $XO_2$, and any combination of two or more thereof; and X is independently selected from Li, Na, and K. In some embodiments, the transition metal ion sequestration agent is coated on the surface of the anode. In some embodiments, the transition metal ion sequestration agent is located in a coating on the surface of the active anode material. In some embodiments, the coating is formed by a method selected from the group consisting of chemical vapor deposition, physical vapor deposition, atomic layer deposition, sol-gel synthesis, co-precipitation synthesis, a spray-drying process, a hydrothermal process, and any combination of two or more thereof. In some embodiments, the coating is formed by slurry casting. In some embodiments, the transition metal ion sequestration agent is located within the anode. In some embodiments, the anode further comprises a composite film, and the transition metal ion sequestration agent is embedded within the composite film.

In some embodiments, the transition metal ion sequestration agent is located in the electrolyte. In further embodiments, the micron or nano-sized inorganic compound contains a compound selected from the group consisting of $X_2CO_3$, XF, $X_2O$, $X_2S$, $X_2CrO_4$, $X_2Cr_2O_7$, $X_2O_2$, $XO_2$, and any combination of two or more thereof; and X is independently selected from Li, Na, and K.

In some embodiments, the transition metal ion sequestration agent is from about 0.1 nm to about 20 microns. In some embodiments, the transition metal ion sequestration agent is from about 0.5 nm to about 25 nm. In some embodiments, the transition metal ion sequestration agent is from about 0.5 nm to about 15 nm. In some embodiments, the transition metal ion sequestration agent is present in the lithium or sodium battery in a concentration of from about 0.01 wt. % to about 20 wt. %. In some embodiments, the transition metal ion sequestration agent is present in the lithium or sodium battery in a concentration of from about 0.01 wt. % to about 2 wt. %. In some embodiments, the transition metal ion sequestration agent is present in the lithium or sodium battery in a concentration of from about 0.1 wt. % to about 1 wt. %.

DETAILED DESCRIPTION

Various embodiments are described hereinafter. It should be noted that the specific embodiments are not intended as an exhaustive description or as a limitation to the broader aspects discussed herein. One aspect described in conjunction with a particular embodiment is not necessarily limited to that embodiment and can be practiced with any other embodiment(s).

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term.

The use of the terms "a" and "an" and "the" and similar referents in the context of describing the elements (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the embodiments and does not pose a limitation on the scope of the claims unless otherwise stated. No language in the specification should be construed as indicating any non-claimed element as essential.

During the charge process of a lithium or sodium battery, lithium or sodium ions are removed from the cathode, transported through the electrolyte, and are inserted into the anode, while electrons are removed from the cathode and injected into the anode through an external circuit (charger). During the use (discharge) of a lithium or sodium battery, lithium or sodium ions are removed from the anode, transported through the electrolyte, and are inserted into the cathode, while electrons flow through an external circuit to provide electrical work. When the battery is fully charged, a highly reactive lithiated or sodiated anode is formed at the anode side; the fully lithiated or sodiated anode has a similar chemical reactivity to lithium or sodium metal, and is thermodynamically incompatible with the solvent. The high performance of lithium or sodium batteries (e.g., long life and stability at ambient conditions) is achieved because of the presence of a solid electrolyte interphase (SEI), an organic/inorganic composite thin film which spontaneously forms on the anode surface during the initial charge of the battery and which acts as a physical barrier to prevent the direct exposure of lithiated or sodiated anode to the electrolyte, thereby stabilizing the lithiated or sodiated anode kinetically.

In a typical lithium or sodium battery, the active cathode materials are lithium or sodium transition metal oxides, many of which contain manganese. During the charging-discharging of the lithium or sodium battery, manganese ions ($Mn^{2+}$) can leach out, dissolve in the electrolyte, and deposit on the surface of the SEI layer of the anode. The migration of $Mn^{2+}$ from the cathode to the anode accelerates interactions with the SEI layer on the anode and reduces the chemical stability of lithiated or sodiated anode toward the electrolyte, and hence deteriorates the electrochemical performance of lithium or sodium batteries which feature a manganese-containing cathode.

In one aspect, provided herein are lithium or sodium batteries with manganese that can migrate from the cathode. The batteries further contain at least one inorganic sequestration agent that captures the manganese before the manganese can interact with the SEI layer on the anode. The batteries disclosed herein have improved performance compared to their counterparts that are devoid of any means to address the deleterious interactions between manganese and the SEI layer. In some embodiments, the at least one inorganic sequestration agent captures one or more of the group consisting of manganese, nickel, cobalt, iron, vanadium, and chromium, which have leached out of the cathode.

In some embodiments, a lithium or sodium battery is provided including an anode, a cathode, an electrolyte, a separator, and at least one inorganic sequestration agent. The inorganic sequestration agent may be a transition metal ion sequestration agent. The inorganic sequestration agent may chemically or physically react with one or more transition metal ions. The inorganic sequestration agent may, for example, adsorb one or more transition metal ions. In various embodiments, the inorganic sequestration agent or transition metal ion sequestration agent is located on and/or within the separator; on and/or within the anode; in the electrolyte; or any combination thereof.

In some embodiments, a lithium or sodium battery is provided including a cathode containing manganese; an anode containing an active anode material; a separator; an electrolyte; and a transition metal ion sequestration agent; wherein the transition metal ion sequestration agent contains a micron or nano-sized inorganic compound and the transition metal ion sequestration agent is located on and/or within the separator; on and/or within the anode; in the electrolyte; or any combination thereof.

The sodium or lithium battery disclosed herein contains at least one inorganic sequestration agent. In some embodiments, the at least one inorganic sequestration agent is at least one transition ion metal sequestration agent. Illustrative inorganic sequestration agents or transition metal ion sequestration agents include, but are not limited to, $X_2CO_3$, $XF$, $X_2O$, $X_2S$, $X_2CrO_4$, $X_2Cr_2O_7$, $X_2O_2$, $XO_2$, or any combination of two or more thereof, and X is independently selected from Li, Na, and K. In some embodiments, the inorganic sequestration agent or transition metal ion sequestration agent is selected from the group consisting of $XF$, $X_2S$, $X_2CrO_4$, $X_2Cr_2O_7$, $X_2O_2$, $XO_2$, and any combination of two or more thereof, and X is independently selected from Li, Na, and K.

In some embodiments, the inorganic sequestration agent or transition metal ion sequestration agent is either micron- or nano-sized. The inorganic sequestration agent or transition metal ion sequestration agent may be from about 0.1 nm to about 20 microns in size. This includes a size of from about 0.1 nm to about 200 nm, about 0.1 nm to about 150 nm, about 0.1 nm to about 100 nm, about 0.1 nm to about 50 nm, about 0.1 nm to about 25 nm, about 0.1 to about 15 nm, about 0.5 nm to about 200 nm, about 0.5 nm to about 150 nm, about 0.5 nm to about 100 nm, about 0.5 nm to about 50 nm, about 0.5 nm to about 25 nm, and about 0.5 to about 15 nm. In some embodiments, the inorganic sequestration agent or transition metal ion sequestration agent is about 0.1, 0.2, 0.3, 0.4, 0.5, 0.6, 0.7, 0.8, 0.9, 1, 2, 3, 4, 5, 6, 7, 8, 9, 10, 11, 12, 13, 14, 15, 16, 17, 18, 19, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, or 200, 250, 300, 350, 400, 450, 500, 550, 600, 650, 700, 750, 800, 850, 900, 950, or 1000 nm in size, including increments therein. In some embodiments, the inorganic sequestration agent or transition metal ion sequestration agent is about 1, 2, 3, 4, 5, 6, 7, 8, 9, 10, 11, 12, 13, 14, 15, 16, 17, 18, 19, or 20 microns in size, including increments therein.

Illustrative methods to prepare the inorganic sequestration agent or the transition metal ion sequestration agent include, but are not limited to, ball-milling, chemical vapor deposition, physical vapor deposition, atomic layer deposition, sol-gel synthesis, co-precipitation synthesis, spray-drying process, and any combination of two or more thereof.

In some embodiments, at least one inorganic sequestration agent or transition metal ion sequestration agent is located on and/or within the separator.

In some embodiments, at least one inorganic sequestration agent or transition metal ion sequestration agent is located in a coating on the surface of the separator. The coating is formed by a method selected from the group consisting of chemical vapor deposition, physical vapor deposition, atomic layer deposition, sol-gel synthesis, co-precipitation synthesis, spray-drying process, hydrothermal, slurry casting, and any combination of two or more thereof. In some embodiments, the slurry casting consists of a polymeric binder and the inorganic sequestration agent. In some embodiments, the polymeric binder of the slurry casting is selected from, but not limited to, the group consisting of polyvinylidene difluoride (PVDF), poly(acrylic acid) (PAA), lithiated PAA, polyimide (PI), polyacrylonitrile (PAN), styrene-butadiene rubber (SBR), carboxymethyl cellulose (CMC), and any combination of two or more thereof.

In some embodiments, at least one inorganic sequestration agent or transition metal ion sequestration agent is present in a concentration of from about 0.01 wt. % to about 20 wt. % of the separator. This includes concentrations of the inorganic sequestration agent or transition metal ion sequestration agent of from about 0.01 wt. % to about 15 wt. %, about 0.01 wt. % to about 10 wt. %, about 0.01 wt. % to about 5 wt. %, about 0.01 wt. % to about 3 wt. %, about 0.01 wt. % to about 1 wt. %, about 0.05 wt. % to about 20 wt. %, about 0.05 wt. % to about 15 wt. %, about 0.05 wt. % to about 10 wt. %, about 0.05 wt. % to about 5 wt. %, about 0.05 wt. % to about 1 wt. %, about 0.1 wt. % to about 20 wt. %, about 0.1 wt. % to about 15 wt. %, about 0.1 wt. % to about 10 wt. %, about 0.1 wt. % to about 5 wt. %, and about 0.1 wt. % to about 1 wt. % of the separator.

In some embodiments, at least one inorganic sequestration agent or transition metal ion sequestration agent is located on and/or within the anode. In some embodiments, at least one inorganic sequestration agent or transition metal ion sequestration agent is located in a coating on the surface of the active anode material. In some embodiments, at least one inorganic sequestration agent or transition metal ion sequestration agent is coated on the surface of the anode. The coating is formed by a method selected from the group consisting of chemical vapor deposition, physical vapor deposition, atomic layer deposition, sol-gel synthesis, co-precipitation synthesis, spray-drying process, hydrothermal, and any combination of two or more thereof. In some embodiments, at least one inorganic sequestration agent or transition metal ion sequestration agent is located within the anode. In some embodiments, the anode further contains a composite film, and the transition metal ion sequestration agent is embedded within the composite film. In some embodiments, the inorganic sequestration agent or transition metal ion sequestration agent is introduced during the preparation of composite film. In some embodiments, the inorganic sequestration agent or transition metal ion sequestration agent is mixed with a polymeric binder, an electrically conductive material, an active negative electrode material, and a solvent to dissolve the polymeric binder, and the resultant slurry is then coated on a current collector to form an anode. In further embodiments, the inorganic sequestration agent or transition metal ion sequestration agent is mixed with a polymeric binder, an electrically conductive material, an active negative electrode material, and a solvent to dissolve the polymeric binder, and the resultant slurry is then coated on a copper foil to form an anode.

In some embodiments, at least one inorganic sequestration agent or transition metal ion sequestration agent is present in a concentration of from about 0.01 wt. % to about 20 wt. % of the anode. This includes concentrations of the inorganic sequestration agent or transition metal ion sequestration agent of from about 0.01 wt. % to about 15 wt. %, about 0.01 wt. % to about 10 wt. %, about 0.01 wt. % to about 5 wt. %, about 0.01 wt. % to about 3 wt. %, about 0.01 wt. % to about 1 wt. %, about 0.05 wt. % to about 20 wt. %, about 0.05 wt. % to about 15 wt. %, about 0.05 wt. % to about 10 wt. %, about 0.05 wt. % to about 5 wt. %, about 0.05 wt. % to about 1 wt. %, about 0.1 wt. % to about 20 wt. %, about 0.1 wt. % to about 15 wt. %, about 0.1 wt. % to about 10 wt. %, about 0.1 wt. % to about 5 wt. %, and about 0.1 wt. % to about 1 wt. % of the anode.

In some embodiments, at least one inorganic sequestration agent or transition metal ion sequestration agent is located in the electrolyte. In some embodiments, at least one inorganic sequestration agent or transition metal ion sequestration agent is suspended in the electrolyte. In some embodiments, the inorganic sequestration agent or transition metal ion sequestration agent is present in a concentration of from about 0.01 wt. % to about 20 wt. % of the electrolyte. This includes concentrations of the inorganic sequestration agent or transition metal ion sequestration agent of from about 0.01 wt. % to about 15 wt. %, about 0.01 wt. % to about 10 wt. %, about 0.01 wt. % to about 5 wt. %, about 0.01 wt. % to about 3 wt. %, about 0.01 wt. % to about 1 wt. %, about 0.05 wt. % to about 20 wt. %, about 0.05 wt. % to about 15 wt. %, about 0.05 wt. % to about 10 wt. %, about 0.05 wt. % to about 5 wt. %, about 0.05 wt. % to about 1 wt. %, about 0.1 wt. % to about 20 wt. %, about 0.1 wt. % to about 15 wt. %, about 0.1 wt. % to about 10 wt. %, about 0.1 wt. % to about 5 wt. %, and about 0.1 wt. % to about 1 wt. % of the electrolyte.

In some embodiments, at least one inorganic sequestration agent or transition metal ion sequestration agent is at least partially dissolved in the electrolyte. In some embodiments, at least one inorganic sequestration agent or transition metal ion sequestration agent is suspended in the electrolyte. In some embodiments, at least one inorganic sequestration agent or transition metal ion sequestration agent is present in the electrolyte as a colloidal suspension.

In some embodiments, at least one inorganic sequestration agent or transition metal ion sequestration agent is present in the sodium or lithium battery in a concentration of from about 0.01 wt. % to about 20 wt. %. This includes a concentration of from about 0.01 wt. % to about 15 wt. %, about 0.01 wt. % to about 10 wt. %, about 0.01 wt. % to about 5 wt. %, about 0.01 wt. % to about 2 wt. %, about 0.01 wt. % to about 1 wt. %, about 0.1 wt. % to about 20 wt. %, about 0.1 wt. % to about 15 wt. %, about 0.1 wt. % to about 10 wt. %, about 0.1 wt. % to about 5 wt. %, about 0.1 wt. % to about 2 wt. %, about 0.1 wt. % to about 1 wt. %, and about 1 wt. % to about 20 wt. %.

The lithium or sodium batteries disclosed herein include an anode. The anode may include one or more of an active negative electrode material, a current collector, an electrically conductive material, and a polymeric binder.

In some embodiments, the anode is a composite film coated on a copper foil. In some embodiments, the composite film comprises or consists of a polymeric binder, an electrically conductive material, and an active negative electrode material.

Illustrative active negative electrode materials include, but are not limited to, graphitic materials, amorphous carbon, $Li_4Ti_5O_{12}$, $M_{1-x}A_xLi_{2-y}B_yTi_{6-z}C_2O_{14-t}Q_t$, tin alloys, silicon alloys, intermetallic compounds, lithium metal, sodium metal, or any combination of two or more thereof; wherein M is selected from Ba, Sr, Ca, Mg, Pb, Sn and other divalent cations; $0 \leq x \leq 0.5$, $0 \leq y \leq 0.5$, $0 \leq z \leq 0.5$, $0 < t \leq 0.5$; each of A, B and C are independently at least one divalent, trivalent or tetravalent metal; and Q is a monovalent or divalent anion. Illustrative graphitic materials include, but are not limited to, natural graphite, artificial graphite, graphitized mesocarbon microbeads, hard carbon, soft carbon, graphene, carbon nanotube and graphite fibers, as well as other amorphous carbon materials.

The anode, or a material used to prepare the anode may additionally be coated with a material such as $Al_2O_3$, $AlF_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, oxyfluorides, or any combination of two or more thereof.

The lithium or sodium batteries disclosed herein also include a cathode. In some embodiments, the cathode contains one or more transition metals. In further embodiments, the cathode contains manganese.

The cathode may include one or more of an active positive electrode material, a current collector, an electrically conductive material, and a polymeric binder. In some embodiments, the cathode is a composite film coated on an aluminum foil. In some embodiments, the composite film comprises or consists of a polymeric binder, an electrically conductive material, and at least one active positive electrode material.

Illustrative active positive electrode materials include, but are not limited to, spinel, olivine, a carbon-coated olivine, $LiFePO_4$, $LiCoO_2$, $LiNiO_2$, $LiNi_{1-x}Co_yM^4_zO_2$, $LiMn_{0.5}Ni_{0.5}O_2$, $Li_{1+x}Mn_{2-z}M^4_yO_{4-m}X^1_n$, $LiFe_{1-z}M^6_y$ $PO_{4-m}X^1_n$, $LiMn_{1/3}Co_{1/3}Ni_{1/3}O_2$, $LiMn_2O_4$, $Li_{1+x}Mn_{2-x}O_4$, $LiFeO_2$, $LiM^4_{0.5}Mn_{1.5}O_4$, $Li_{1+x''}Ni_\alpha Mn_\beta CO_\gamma M^5_\delta O_{2-z''}F_{z'''}$, $Li_2MnO_3—Li_aM_bM'_cM''_dO_e$, $Li_nB^1_2(M^2O_4)_3$ (NASICON-structured), $Li_3Al_{0.1}V_{1.9}(PO_4)_3$ (NASICON-structured), $Li_2MSiO_4$, and any combination of two or more thereof, wherein $M^2$ is P, S, Si, W, or Mo; $M_4$ is Al, Mg, Ti, B, Ga, Si, Ni, or Co; $M^5$ is Mg, Zn, Al, Ga, B, Zr, or Ti; A is Li, Ag, Cu, Na, Mn, Fe, Co, Ni, Cu, or Zn; $M^6$ is Al, Mg, Ti, B, Ga, Si, Ni, Mn or Co; M, M', and M" are transition metals; $B^1$ is Ti, V, Cr, Fe, or Zr; $X^1$ is S or F; $0 \leq x \leq 0.3$; $0 \leq y \leq 0.5$; $0 \leq z \leq 0.5$; $0 \leq m \leq 0.5$; $0 \leq n \leq 0.5$; $0 \leq x'' \leq 0.4$; $0 \leq a \leq 2$; $0 \leq b \leq 1$; $0 \leq c \leq 1$; $0 \leq d \leq 1$; $0 \leq \alpha \leq 1$; $0 \leq \beta \leq 1$; $0 \leq \gamma \leq 1$; $0 \leq \delta \leq 0.4$; $0 \leq z'' \leq 0.4$; $0 \leq n' \leq 3$; $0 < a+b+c+d < 6$; $0 < e \leq 4$; and $0 < \alpha+\beta+\gamma+\delta$. The active positive electrode material may include a blend of a spinel and $Li_{1+x''}Ni_\alpha Mn_\beta CO_\gamma M^5_\delta O_{2-z''}F_{z'''}$, wherein $M^5$ is Mg, Zn, Al, Ga, B, Zr, or Ti; $0 < x'' < 0.4$; $0 \leq \alpha \leq 1$; $0 \leq \beta \leq 1$; $0 \leq \gamma \leq 1$; $0 \leq \delta \leq 0.4$; $0 < z'' < 0.4$; and $0 < \alpha+\beta+\gamma+\delta$. In some embodiments, the ratio of the spinel to the $Li_{1+x''}Ni_\alpha Mn_\beta CO_\gamma M^5_\delta O_{2-z''}F_{z'''}$ may be from about 0.5 wt. % to about 98 wt. %. In some embodiments, the active positive electrode material includes a blend of an olivine or a carbon-coated olivine, and $Li_{1+x''}Ni_\alpha Mn_\beta CO_\gamma M^5_\delta O_{2-z''}F_{z'''}$, wherein $M^5$ is Mg, Zn, Al, Ga, B, Zr, or Ti; $0 \leq x'' \leq 0.4$; $0 \leq \alpha \leq 1$; $0 \leq \beta \leq 1$; $0 \leq \gamma \leq 1$; $0 \leq \delta \leq 0.4$; $0 \leq z'' \leq 0.4$; and $0 < \alpha+\beta+\gamma+\delta$. In some embodiments, the active positive electrode materials are selected from vanadium oxide, $TiS_2$, $LiFePO_4$, $LiMnPO_4$, $LiFe_xMn_{1-x}PO_4$, $Li_{1+x}[M_yMn_{2-x-y}]O4$ spinel, layered lithium transition metal oxides, S, Se, $S_xSe_y$, and any combination of two or more thereof. In some embodiments, where the cathode is for use in a sodium battery, the active positive electrode material includes $NaM_{1-x}M'_xPO_4$, $Na_xM_yM'_zO_2$, $Na_2FePO_4F$, $Na_2MnPO_4F$, $NaFeSO_4F$, $NaMnSO_4F$, $NaV_{1-a}Cr_aPO_4F$, $Na_2S$, $Na_2Se$, or any combination of two or more thereof, wherein $0 < x$; $0 < y+z$; M is Mn, Ni, Fe, Co, or Cu; M' is Cr or Mg; and $0 \leq a \leq 1$. The active positive electrode material may include $Na_nCoO_2$, $Na_nMnO_2$, $Na_nNiO_2$, $Na_nC_{O2/3}Mn_{1/3}O_2$, $Na_nNi_xZn_yMn_zO_2$ (x+y+z=1), $NaFePO_4$, $Na_xFe_{0.5}Mn_{0.5}PO_4$, $Na_3V_2(PO_4)_3$, $Na_2FePO_4F$, or $NaFeSO_4F$, or any combination thereof, wherein $0 < n < 1$. In some embodiments, the at least one active positive electrode material is of uniform composition or of a gradient composition. In some embodiments, a gradient composition refers to a composition of the material which varies across the electrode particles.

The cathode, or a material used to prepare the cathode may additionally be coated with a material such as $Al_2O_3$, $AlF_3$, $ZrO_2$, $SiO_2$, MgO, $TiO_2$, CaO, $SnO_2$, $WO_3$, $In_2O_3$, $Ga_2O_3$, $Sc_2O_3$, $Y_2O_3$, $La_2O_3$, $HfO_2$, $V_2O_5$, $Nb_2O_5$, $Ta_2O_5$, MnO, $MnO_2$, CoO, $Co_2O_3$, NiO, $NiO_2$, CuO, ZnO, $MgF_2$, $CaF_2$, Mo, Ta, W, Fe, Co, Cu, Ru, Pa, Pt, Al, Si, Se, oxyfluorides, or any combination of two or more thereof.

When used, the binder may be present in the electrode in an amount of from about 0.1 wt. % to about 99 wt. %. In some embodiments, the binder is present in the electrode in an amount of from about 2 wt. % to about 20 wt. %. Illustrative binders include, but are not limited to, polyvinylidene fluoride (PVDF), poly(acrylic acid) (PAA), lithiated PAA, polyvinyl alcohol (PVA), polyethylene, polystyrene, polyethylene oxide, polytetrafluoroethylene (Teflon), polyacrylonitrile (PAN), polyimide (PI), styrene butadiene rubber (SBR), carboxy methyl cellulose (CMC), gelatine, sodium alginate, polythiophene, polyacetylene, poly(9,9-dioctylfluorene-co-fluorenone), poly(9,9-dioctylfluorene-co-fluorenone-co-methylbenzoic ester), a copolymer of any two or more such polymers, and a blend of any two or more such polymers. In some embodiments, the binder is an electrically conductive polymer such as, but not limited to, polythiophene, polyacetylene, poly(9,9-dioctylfluorene-co-fluorenone), poly(9,9-dioctylfluorene-co-fluorenone-co-methylbenzoic ester), and a copolymer of any two or more such conductive polymers.

Illustrative electrically conductive materials include, but are not limited to, graphite, graphene, expanded graphite, reduced graphene oxide, acetylene black, carbon black, a metal-organic framework, porous carbon, carbon spheres, carbon aerogel, single-walled carbon nanotubes, multi-walled carbon nanotubes, carbon nanofibers, carbon nanotube arrays, and any combination of two or more thereof. Commercial examples of carbon black include, but are not limited to, TIMCAL Super C45®, Super-PR, Black Pearls® 2000, Denka Black®, Vulcan® XC72R, and Ketjenblack®.

The current collector may be prepared from a wide variety of materials. For example, illustrative current collectors include, but are not limited to, copper, stainless steel, titanium, tantalum, platinum, palladium, gold, silver, iron, aluminum, nickel, rhodium, manganese, vanadium, titanium, tungsten, cobalt nickel alloy, highly alloyed ferritic stainless steel containing molybdenum and chromium; or nickel-, chromium-, or molybdenum-containing alloys, or a carbon-coated metal described above. The current collector may take the form of a foil, mesh, or screen.

The lithium or sodium battery disclosed herein contains an electrolyte. In some embodiments, the electrolyte includes an alkali metal salt dissolved in a polar aprotic solvent. In some embodiments, the alkali metal salt is present at a concentration of from about 0.5 to about 2 M. This includes a concentration of about 0.5 M to about 1.5 M, about 0.8 M to about 2.0 M, and about 1.0 M to about 2.0 M. In some embodiments, the salt is present in the electrolyte at a concentration of about 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, or 3.0 M, including increments therein. In some embodiments, the alkali metal salt is a lithium or sodium salt.

Illustrative solvents include, but are not limited to, ethylene carbonate (EC), ethyl methyl carbonate (EMC), dimethylcarbonate (DMC), diethylcarbonate (DEC), propylene carbonate (PC), dioloxane, γ-butyrolactone, δ-butyrolactone, dimethyl ether, a silane, siloxane N-methyl acetamide, acetonitrile, an acetal, a ketal, esters, a carbonates, a sulfone, a sulfite, sulfolane, an aliphatic ether, a cyclic ether, a glyme, a polyether, a phosphate ester, a siloxane, a N-alkylpyrrolidone, fluoro ethers and fluoro esters, fluoroethylene carbonate, adiponitrile, and any combination of two or more thereof.

Illustrative mixtures of solvents include, but are not limited to, EC-DMC, EC-EMC, EC-DEC, EC-PC, EC-PC-DMC, EC-PC-DEC, and EC-DEC-DMC. In some embodiments, fluorinated derivatives of the solvents described above are used.

Illustrative salts include, but are not limited to, a lithium salt, a sodium salt, an ammonium salt, an alkylammonium salt, a lithium polysulfide, a lithium polyselenide, and any combination of two or more thereof. In some embodiments, the salts are selected from $LiPF_6$, $LiClO_4$, $(C_4BO_8Li)$, $(C_2BO_4F_2Li)$, $LiPF_4C_2O_4$, $Li(CF_3SO_2)_2N$, $LiC(SO_2CF_3)_3$, $(Li(C_2F_5SO_2)_2N)$, $LiCF_3SO_3$, $Li_2B_{12}X_{12-n}H_n$, $Li_2B_{10}X_{10-n'}H_{n'}$ (where X is a halogen, n is an integer from 0 to 12, and n' is an integer from 0 to 10), $LiAlF_4$, $LiBF_4$, $Li(FSO_2)_2N$, $Li_2SO_4$, $Na_2SO_4$, $NaPF_6$, $NaClO_4$, $NaBF_4$, $NaCF_3SO_3$, $NaN(SO_2CF_3)$, $LiAlO_2LiSCN$, LiBr, LiI, $LiAsF_6$, $LiB(Ph)_4$, $LiSO_3CH_3$, $Li_2S_{x''}$, $Li_2Se_{x''}$, $(LiS_{x''}R)_y$, $(LiSe_{x''}R)_y$ (wherein x" is an integer from 1 to 20, y is an integer from 1 to 3, and R is H, alkyl, alkenyl, aryl, ether, F, $CF_3$, $COCF_3$, $SO_2CF_3$, or $SO_2F$), and any combination of two or more thereof.

In some embodiments, the electrolyte is non-aqueous and includes at least one electrode stabilizing additive to protect the electrodes from degradation. Illustrative electrode stabilizing additives are described in co-pending U.S. patent application Ser. Nos. 10/857,365, 11/279,120, and 60/647,361, all of which are incorporated by reference herein in their entirety. In some embodiments, the electrolyte contains at least one electrode stabilizing additive that can be reduced or polymerized on the surface of a negative electrode to form a passivation film on the surface of the negative electrode. In some embodiments, the electrolyte contains at least one electrode stabilizing additive that can be oxidized or polymerized on the surface of a positive electrode to form a passivation film on the surface of the positive electrode. In some embodiments, the electrolyte contains at least one electrode stabilizing additive that can be reduced or polymerized on the surface of a negative electrode to form a passivation film on the surface of the negative electrode and at least one electrode stabilizing additive that can be oxidized or polymerized on the surface of a positive electrode to form a passivation film on the surface of the positive electrode. In some embodiments, the electrolyte contains a first electrode stabilizing additive for forming a passivation film on the cathode to prevent leaching of metal ions and a second electrode stabilizing additive for passivating the anode surface to prevent or lessen the reduction of metal ions at the anode.

The at least one electrode stabilizing additive may be present at a concentration of about 0.001 to about 8 wt. %. This includes a concentration of about 0.001 to about 5 wt. %, about 0.001 to about 3 wt. %, about 0.001 to about 1 wt. %, about 0.01 to about 8 wt. %, about 0.01 to about 5 wt. %, about 0.01 to about 3 wt. %, about 0.01 to about 1 wt. %, about 0.1 to about 8 wt. %, about 0.1 to about 5 wt. %, about 0.1 to about 3 wt. %, and about 0.1 to about 1 wt. % . . . . In some embodiments, the electrode stabilizing additive is present in the electrolyte in an amount of about 0.001; 0.003; 0.006; 0.01; 0.03; 0.06; 0.1; 0.3; 0.6; 1; 2; 3; 4; 5; 6; 7; or 8 wt. %.

In some embodiments, the electrode stabilizing additive is a substituted or unsubstituted linear, branched or cyclic hydrocarbon including at least one oxygen atom and at least one aryl, alkenyl or alkynyl group. In some embodiments, the electrode stabilizing additive is a substituted aryl compound or a substituted or unsubstituted heteroaryl compound comprising at least one oxygen atom.

Representative electrode stabilizing additives include, but are not limited to, 1,2-divinyl furoate, 1,3-butadiene carbonate, 1-vinylazetidin-2-one, 1-vinylaziridin-2-one, 1-vinylpiperidin-2-one, 1 vinylpyrrolidin-2-one, 2,4-divinyl-1,3-dioxane, 2 amino-3 vinylcyclohexanone, 2-amino-3-vinylcyclopropanone, 2 amino-4-vinylcyclobutanone, 2-amino-5-vinylcyclopentanone, 2-aryloxy-cyclopropanone, 2-vinyl-[1,2]oxazetidine, 2 vinylaminocyclohexanol, 2-vinylaminocyclopropanone, 2 vinyloxetane, 2-vinyloxy-cyclopropanone, 3-(N-vinylamino)cyclohexanone, 3,5-divinyl furoate, 3-vinylazetidin-2-one, 3 vinylaziridin 2 one, 3 vinylcyclobutanone, 3 vinylcyclopentanone, 3 vinyloxaziridine, 3 vinyloxetane, 3-vinylpyrrolidin-2-one, 4,4 divinyl-3 dioxolan 2-one, 4 vinyltetrahydropyran, 5-vinylpiperidin-3-one, allylglycidyl ether, butadiene monoxide, butyl vinyl ether, dihydropyran-3-one, divinyl butyl carbonate, divinyl carbonate, divinyl crotonate, divinyl ether, divinyl ethylene carbonate, divinyl ethylene silicate, divinyl ethylene sulfate, divinyl ethylene sulfite, divinyl methoxypyrazine, divinyl methylphosphate, divinyl propylene carbonate, ethyl phosphate, methoxy-o-terphenyl, methyl phosphate, oxetan-2-yl-vinylamine, oxiranylvinylamine, vinyl carbonate, vinyl crotonate, vinyl cyclopentanone, vinyl ethyl-2-furoate, vinyl ethylene carbonate, vinyl ethylene silicate, vinyl ethylene sulfate, vinyl ethylene sulfite, vinyl methacrylate, vinyl phosphate, vinyl-2-furoate, vinylcylopropanone, vinylethylene oxide, and any combination of two or more thereof.

In some embodiments the electrode stabilizing additive is a cyclotriphosphazene substituted with F, alkyloxy, alkenyloxy, aryloxy, methoxy, allyloxy groups, or any combination of two or more thereof. In some embodiments, the electrode stabilizing additive is selected from the group consisting of (divinyl)-(methoxy) (trifluoro)cyclotriphosphazene, (trivinyl) (difluoro)(methoxy)cyclotriphosphazene, (vinyl) (methoxy) (tetrafluoro)cyclotriphosphazene, (aryloxy) (tetrafluoro)(methoxy)-cyclotriphosphazene, (diaryloxy) (trifluoro)(methoxy)cyclotriphosphazene compounds, and any combination of two or more thereof. In some embodiments, the electrode stabilizing additive is vinyl ethylene carbonate, vinyl carbonate, 1,2-diphenyl ether, or any combination of two or more thereof.

Additional illustrative electrode stabilizing additives include, but are not limited to, compounds with phenyl, naphthyl, anthracenyl, pyrrolyl, oxazolyl, furanyl, indolyl, carbazolyl, imidazolyl, or thiophenyl groups. In some embodiments, the electrode stabilizing additive is aryloxypyrrole, aryloxy ethylene sulfate, aryloxy pyrazine, aryloxycarbazole trivinylphosphate, aryloxy-ethyl-2-furoate, aryloxy-o-terphenyl, aryloxy-pyridazine, butyl-aryloxy-ether, divinyl diphenyl ether, (tetrahydro-furan-2-yl)-vinylamine, divinyl methoxybipyridine, methoxy-4-vinylbiphenyl, vinyl methoxy carbazole, vinyl methoxy piperidine, vinyl methoxypyrazine, vinyl methyl carbonate-allylanisole, vinyl pyridazine, 1-divinylimidazole, 3-vinyltetrahydrofuran, divinyl furan, divinyl methoxy furan, divinylpyrazine, vinyl methoxy imidazole, vinylmethoxy pyrrole, vinyl-tetrahydrofuran, 2,4-divinyl isooxazole, 3,4 divinyl-1-methyl pyrrole, aryloxyoxetane, aryloxy-phenyl carbonate, aryloxypiperidine, aryloxy-tetrahydrofuran, 2-aryl-cyclopropanone, 2-diaryloxy-furoate, 4-allylanisole, aryloxy-carbazole, aryloxy-2-furoate, aryloxy-crotonate, aryloxy-cyclobutane, aryloxy-cyclopentanone, aryloxy-cyclopropanone, aryloxy-cycolophosphazene, aryloxy-ethylene silicate, aryloxy-ethylene sulfate, aryloxy-ethylene sulfite, aryloxy-imidazole, aryloxy-methacrylate, aryloxy-phosphate, aryloxy-pyrrole, aryloxy-quinoline, diaryloxy-cyclotriphosphazene, diaryloxy ethylene carbonate, diaryloxy furan, diaryloxy methyl phosphate, diaryloxy-butyl carbonate, diaryloxy-crotonate, diaryloxy-diphenyl ether, diaryloxy-ethyl silicate, diaryloxy-ethylene silicate, diaryloxy-ethylene sulfate, diaryloxyethylene sulfite, diaryloxy-phenyl carbonate, diaryloxy-propylene carbonate, diphenyl carbonate, diphenyl diaryloxy silicate, diphenyl divinyl silicate, diphenyl ether, diphenyl silicate, divinyl methoxydiphenyl ether, divinyl phenyl carbonate, methoxycarbazole, or 2,4-dimethyl-6-hydroxy-pyrimidine, vinyl methoxyquinoline, pyridazine, vinyl pyridazine, quinoline, vinyl quinoline, pyridine, vinyl pyridine, indole, vinyl indole, triethanolamine, 1,3-dimethyl butadiene, butadiene, vinyl ethylene carbonate, vinyl carbonate, imidazole, vinyl imidazole, piperidine, vinyl piperidine, pyrimidine, vinyl pyrimidine, pyrazine, vinyl pyrazine, isoquinoline, vinyl isoquinoline, quinoxaline, vinyl quinoxaline, biphenyl, 1,2-diphenyl ether, 1,2-diphenylethane, o terphenyl, N-methyl pyrrole, naphthalene, or any combination of two or more thereof.

In some embodiments, the electrode stabilizing additive includes substituted or unsubstituted spirocyclic hydrocarbons containing at least one oxygen atom and at least one alkenyl or alkynyl group. In further embodiments, the stabilizing additives include those having Formula X:

X wherein $A^1$, $A^2$, $A^3$, and $A^4$ are independently O or $CR^{12}R^{13}$; provided that $A^1$ is not O when $G^1$ is O, $A^2$ is not O when $G^2$ is O, $A^3$ is not O when $G^3$ is O, and $A^4$ is not O when $G^4$ is O; $G^1$, $G^2$, $G^3$, and $G^4$ are independently O or $CR^{12}R^{13}$; provided that $G^1$ is not O when $A^1$ is O, $G^2$ is not O when $A^2$ is O, $G^3$ is not O when $A^3$ is O, and $G^4$ is not O when $A^4$ is O; $R^{10}$ and $R^{11}$ are independently a substituted or unsubstituted divalent alkenyl or alkynyl group; and $R^{12}$ and $R^{13}$ at each occurrence are independently H, F, Cl, or a substituted or an unsubstituted alkyl, alkenyl, or alkynyl group.

Representative examples of Formula X include, but are not limited to, 3,9 divinyl-2,4,8,10-tetraoxaspiro[5.5]undecane, 3,9-divinyl-2,4,8-trioxaspiro[5.5]undecane, 3,9-divinyl-2,4-dioxaspiro[5.5]undecane, 3,9-diethylidene-2,4,8,10-tetraoxaspiro[5.5]undecane, 3,9 diethylidene-2,4,8-trioxaspiro[5.5]undecane, 3,9-diethylidene-2,4-dioxaspiro[5.5]undecane, 3,9-dimethylene-2,4,8,10-tetraoxaspiro[5.5]undecane, 3,9-divinyl-1,5,7,11-tetraoxaspiro[5.5]undecane, 3,9 dimethylene-1,5,7,11-tetraoxaspiro[5.5]undecane, 3,9 diethylidene-1,5,7,11-tetraoxaspiro[5.5]undecane, or any combination of two or more thereof.

In some embodiments, the electrode stabilizing additive is an anion receptor. In some embodiments, the anion receptor is a Lewis acid. In some embodiments, the anion receptor is a borane, a boronate, a borate, a borole, or a mixture of any two or more thereof.

In some embodiments, the anion receptor is a compound of Formula XI:

XI wherein each $R^{14}$, $R^{15}$, and $R^{16}$ are independently halogen, alkyl, aryl, halogen-substituted alkyl, halogen-substituted aryl, or $OR^{17}$; or any two of $R^{14}$, $R^{15}$, $R^{16}$ and $R^{17}$, together with the atoms to which they are attached, form a heterocyclic ring having 5-9 members, and $R^{17}$ is at each occurrence independently alkyl, aryl, halogen-substituted alkyl, or halogen-substituted aryl. In further embodiments, $R^{14}$, $R^{15}$, and $R^{16}$ are independently halogen, alkyl, aryl, halogen-substituted alkyl, or halogen-substituted aryl; or any two of $R^{14}$, $R^{15}$, and $R^{16}$, together with the boron to which they are attached, form a heterocyclic ring having 5-9 members.

In some embodiments, the anion receptors include, but are not limited to, tri (propyl) borate, tris(1,1,1,3,3,3-hexafluoro-propan-2-yl) borate, tris(1,1,1,3,3,3-hexafluoro-2-phenyl-propan-2-yl) borate, tris(1,1,1,3,3,3-hexafluoro-2-(trifluoromethyl) propan-2-yl) borate, triphenyl borate, tris (4-fluorophenyl) borate, tris(2,4-difluorophenyl) borate, tris (2,3,5,6-tetrafluorophenyl) borate, tris(pentafluorophenyl) borate, tris(3-(trifluoromethyl)phenyl) borate, tris(3,5-bis (trifluoromethyl)phenyl) borate, tris(pentafluorophenyl) borane, or a mixture of any two or more thereof. Further suitable additives include 2-(2,4-difluorophenyl)-4-fluoro-1,3,2-benzodioxaborole, 2-(3-trifluoromethyl phenyl)-4-fluoro-1,3,2-benzodioxaborole, 2,5-bis(trifluoromethyl)phenyl-4-fluoro-1,3,2-benzodioxaborole, 2-(4-fluorophenyl)-tetrafluoro-1,3,2-benzodioxaborole, 2-(2,4-difluorophenyl)-tetrafluoro-1,3,2-benzodioxaborole, 2-(pentafluorophenyl)-tetrafluoro-1,3,2-benzodioxaborole, 2-(2-trifluoromethyl phenyl)-tetrafluoro-1,3,2-benzodioxaborole, 2,5-bis(trifluoromethyl phenyl)-tetrafluoro-1,3,2-benzodioxaborole, 2-phenyl-4,4,5,5-tetra(trifluoromethyl)-1,3,2-benzodioxaborolane, 2-(3,5-difluorophenyl-4,4,5,5-tetrakis(trifluoromethyl)-1,3,2-dioxaborolane, 2-(3,5-difluorophenyl-4,4,5,5-tetrakis(trifluoromethyl)-1,3,2-dioxaborolane, 2-pentafluorophenyl-4,4,5,5-tetrakis(trifluoromethyl)-1,3,2-dioxaborolane, bis(1,1,1,3,3,3-hexafluoroisopropyl)phenylboronate, bis(1,1,1,3,3,3-hexafluoroisopropyl)-3,5-difluorophenylboronate, bis(1,1,1,3,3,3-hexafluoroisopropyl) pentafluorophenylboronate, or a mixture of any two or more thereof.

The sodium or lithium battery disclosed herein contains a separator. In some embodiments, the separator is a microporous polymer separator. Illustrative separators include, but are not limited to, Celgard® 2325, Celgard® 2400, Celgard® 3501, and a glass fiber separator.

In another aspect, provided herein are methods to prepare an anode, cathode, or separator disclosed herein.

In another aspect, provided herein are methods to prepare a sodium or lithium battery disclosed herein.

The present invention, thus generally described, will be understood more readily by reference to the following examples, which are provided by way of illustration and are not intended to be limiting of the present invention.

EXAMPLES

Example 1. Assessment of Electrolyte Compositions

In an argon atmosphere glove box, 0.5 grams of $Li_2CO_3$, $Li_2O$, and LiF were each added to an electrolyte containing 1.2 M $LiPF_6$, 30 wt. % ethylene carbonate, 70 wt. % ethyl methyl carbonate, and 38.7 µg/g $Mn^{2+}$ to determine how well each material would sequester the $Mn^{2+}$ ions from the electrolyte. The materials in the electrolyte were stirred in an argon atmosphere glove box overnight. Then, the electrolyte was subjected to an ICP-MS analysis. A portion of each sample was filtered through a syringe mountable filter disk (Whatman PuraDisk TF-25, 0.2 µm pore size) to remove solids. An approximately 2-gram portion of each filtered electrolyte solution was transferred to a polypropylene centrifuge tube and weighed. The volatile fraction of the solvent was evaporated by heating in a water bath under a nitrogen stream. Then, the residue was dissolved in 2% nitric acid and brought to a volume of 10 mL. The resulting solutions were analyzed with a Perkin Elmer/Sciex ELAN DRC-II ICP-MS to determine the concentration of the manganese ion. Concentrations in the electrolytes were calculated from the ICP-MS concentrations, the mass of sample taken, and the dilution volume. To convert the concentrations in µg/g to equivalent concentrations as µg/mL, the density of the electrolyte solution was applied. The results are in Table 1.

TABLE 1

| Sample Description | Mn (µg/g) | Mn (µg/mL) |
|---|---|---|
| Pure Electrolyte | 0.005 | 0.006 |
| Electrolyte with $Mn^{2+}$ ions | 38.7 | 46.9 |
| Electrolyte with $Mn^{2+}$ ions with LiF | 8.85 | 10.6 |
| Electrolyte with $Mn^{2+}$ ions with $Li_2O$ | 0.039 | 0.046 |
| Electrolyte with $Mn^{2+}$ ions with $Li_2CO_3$ | 0.026 | 0.031 |

Example 2. Exemplary Assessment of $Li_2CO_3$ in a Lithium-Ion Battery

Figure 1:
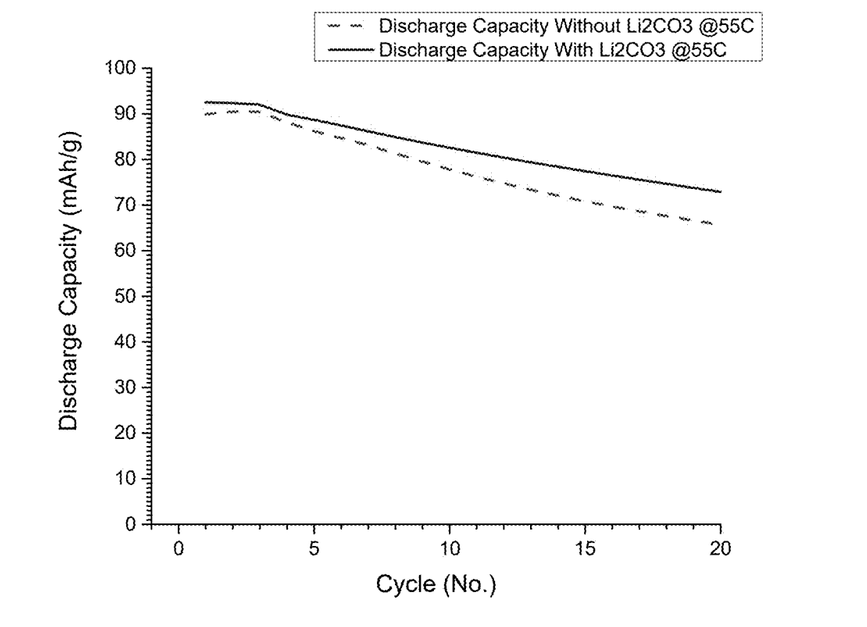
FIG. 1 depicts the discharge capacity of illustrative lithium-ion cells with or without $Li_2CO_3$ as the transition metal ion sequestration agent showing the positive impact of depositing $Li_2CO_3$ on Celgard 2325 separator under severe fading conditions (e.g., operating temperature of 55° C.).

To determine the impact of introducing $Li_2CO_3$ in the lithium-ion battery, $Li_2CO_3$ powder was coated onto the separator using a slurry of $Li_2CO_3$, 1-methyl-2-pyrrolidone (NMP), and polyvinylidene fluoride (PVDF) and a doctor blade to form a thin film on the separator surface. Subsequently, cells were assembled using uncoated and coated separators, $Li_xMn_2O_4$ cathodes, MCMB graphite anodes, and an electrolyte of 1.2 M $LiPF_6$ in 30 wt. % ethylene carbonate and 70 wt. % ethyl methyl carbonate. The cells completed three formation cycles at room temperature and then completed fifty cycles at 55° C. to accelerate the capacity fade associated with the dissolution of $Mn^{2+}$ in the electrolyte. The results are presented in FIG. 1.

Example 3

The transition metal ion sequestration agent material is balled milled using a ceramic enclosure and ceramic balls to form a nanophase material. The nanophase material is then mixed into a slurry of a solvent and binding agent and cast onto a separator to form a thin film.

Example 4

The transition metal ion sequestration agent material is deposited on a separator using a chemical vapor deposition technique.

Example 5

The transition metal ion sequestration agent material is deposited on a separator using an atomic layer deposition technique.

Example 6

The transition metal ion sequestration agent material is deposited onto a very high surface area catalyst substrate such as aluminum oxide nano-powder (Strem Chemicals) or Catalyst Substrate Spheres (BASF) using atomic layer deposition. The substrate with the deposition is then mixed into a slurry of a solvent and binding agent and cast onto a separator to form a thin film.

Example 7

The transition metal ion sequestration agent material is mixed into a slurry of a solvent and binding agent, and cast on an anode laminate electrode to form a thin film.

Example 8

The transition metal ion sequestration agent material is balled milled using a ceramic enclosure and ceramic balls to form a nanophase. The nanophase material is then mixed into a slurry of solvent and binding agent and cast on an anode laminate electrode to form a thin film.

Example 9

The transition metal ion sequestration agent material is deposited onto a very high surface area catalyst substrate such as aluminum oxide nano-powder (Strem Chemicals) or Catalyst Substrate Spheres (BASF) using atomic layer deposition. The substrate with the deposition is then mixed into a slurry of a solvent and binding agent and cast onto an anode electrode to form a thin film.

Example 10

The transition metal ion sequestration agent material is mixed into a slurry of a solvent, active anode material, electrical conducting agent, and binding agent, and cast on a current collector to form an anode electrode.

Example 11

The transition metal ion sequestration agent material is balled milled using a ceramic enclosure and ceramic balls to form a nanophase. The nanophase material is then mixed into a slurry of solvent, active anode material, electrical conducting agent, and binding agent and cast on a current collector to form an anode electrode.

Example 12

The transition metal ion sequestration agent material is deposited onto a very high surface area catalyst substrate such as aluminum oxide nano-powder (Strem Chemicals) or Catalyst Substrate Spheres (BASF) using atomic layer deposition. The substrate with the deposition is then mixed into a slurry of a solvent, active anode material, electrical conducting agent, and binding agent and cast on a current collector to form an anode electrode.

Example 13

The transition metal ion sequestration agent material is deposited on an active anode material using a chemical vapor deposition technique. The active anode material with the deposition is then mixed into a slurry of a solvent, electrical conducting agent, and binding agent and cast on a current collector to form an anode electrode.

Example 14

The transition metal ion sequestration agent material is deposited on an active anode material using an atomic layer deposition technique. The active anode material with the deposition is then mixed into a slurry of a solvent, electrical conducting agent, and binding agent and cast on a current collector to form an anode electrode.

Example 15

The transition metal ion sequestration agent material is deposited on an anode electrode using a chemical vapor deposition technique.

Example 16

The transition metal ion sequestration agent material is deposited on an anode electrode using an atomic layer deposition technique.

Example 17

One or more of the transition metal ion sequestration agent materials is mixed into the electrolyte to form a colloidal suspension.

Example 18

A sodium or lithium ion battery prepared using at least one of the anodes, electrolytes, or separators described in Examples 2-17.

While certain embodiments have been illustrated and described, it should be understood that changes and modifications can be made therein in accordance with ordinary skill in the art without departing from the technology in its broader aspects as defined in the following claims.

The embodiments, illustratively described herein may suitably be practiced in the absence of any element or elements, limitation or limitations, not specifically disclosed herein. Thus, for example, the terms "comprising," "including," "containing," etc. shall be read expansively and without limitation. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the claimed technology. Additionally, the phrase "consisting essentially of" will be understood to include those elements specifically recited and those additional elements that do not materially affect the basic and novel characteristics of the claimed technology. The phrase "consisting of" excludes any element not specified.

The present disclosure is not to be limited in terms of the particular embodiments described in this application. Many modifications and variations can be made without departing from its spirit and scope, as will be apparent to those skilled in the art. Functionally equivalent methods and compositions within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like, include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

Other embodiments are set forth in the following claims.

What is claimed is:

1. A sodium battery comprising:
a cathode comprising manganese;
an anode comprising an active anode material;
a separator;
an electrolyte; and
a transition metal ion sequestration agent;
wherein:
the transition metal ion sequestration agent comprises a micron or nano-sized inorganic compound that is $Na_2Cr_2O_7$; and
the anode or electrolyte comprises the transition metal ion sequestration agent.

2. The sodium battery of claim 1, wherein the anode comprises the transition metal ion sequestration agent.

3. The sodium battery of claim 1, wherein a surface of the anode comprises the transition metal ion sequestration agent.

4. The sodium battery of claim 1, wherein a coating on the surface of the active anode material comprises the transition metal ion sequestration agent.

5. The sodium battery of claim 2, wherein the anode further comprises a composite film, and the transition metal ion sequestration agent is embedded within the composite film.

6. The sodium battery of claim 1, wherein the electrolyte comprises the transition metal ion sequestration agent.

7. The sodium battery of claim 1, wherein a size of the transition metal ion sequestration agent is from about 0.1 nm to about 20 microns.

8. The sodium battery of claim 1, wherein a size of the transition metal ion sequestration agent is from about 0.5 nm to about 25 nm.

9. The sodium battery of claim 1, wherein the transition metal ion sequestration agent is from about 0.5 nm to about 15 nm.

10. The sodium battery of claim 1, wherein the transition metal ion sequestration agent is present in the sodium battery at a concentration of from about 0.01 wt. % to about 20 wt. % based on a total weight of the anode.

11. The sodium battery of claim 1, wherein the transition metal ion sequestration agent is present in the sodium battery at a concentration of from about 0.01 wt. % to about 2 wt. % based on a total weight of the anode.

12. A sodium battery comprising:
a cathode comprising manganese;
an anode comprising an active anode material;
a separator;
an electrolyte solution comprising a polar aprotic solvent and a salt; and
a coating on the surface of the anode comprising a transition metal ion sequestration agent;
wherein:
the transition metal ion sequestration agent comprises a micron or nano-sized inorganic compound that is $Na_2Cr_2O_7$; and
the transition metal ion sequestration agent is a manganese ion sequestration agent.

* * * * *